United States Patent [19]

Rosenfeld

[11] 4,278,785

[45] Jul. 14, 1981

[54] POLYESTER COMPOSITION, PROCESS THEREFOR AND MOLDED ARTICLES THEREFROM

[75] Inventor: Jerold C. Rosenfeld, Tonawanda, N.Y.

[73] Assignee: Hooker Chemicals & Plastics Corp., Niagara Falls, N.Y.

[21] Appl. No.: 45,464

[22] Filed: Jun. 4, 1979

[51] Int. Cl.³ .................... C08G 63/66; C08G 63/68; C08G 63/76

[52] U.S. Cl. .................. 528/176; 528/126; 528/128; 528/167; 528/169; 528/173; 528/179; 528/184; 528/190; 528/191; 528/193; 528/194; 528/274; 528/271; 528/302; 528/308; 528/309

[58] Field of Search .............. 528/125, 126, 128, 167, 528/169, 173, 176, 179, 184, 190, 191, 193, 194, 271

[56] References Cited

U.S. PATENT DOCUMENTS

| | | | |
|---|---|---|---|
| 3,160,602 | 12/1965 | Kantor et al. | 528/179 |
| 3,177,179 | 4/1965 | Lee et al. | 260/47 |
| 3,216,970 | 11/1965 | Conix | 528/179 |
| 3,471,441 | 10/1969 | Hindersinn | 528/179 |
| 3,546,165 | 12/1970 | Morgan | 260/47 |
| 3,939,117 | 2/1976 | Ueno | 528/179 |
| 3,956,422 | 5/1976 | Takahashi et al. | 260/873 |
| 4,049,611 | 9/1977 | Hirzy . | |
| 4,182,725 | 1/1980 | Floyd et al. . | |

FOREIGN PATENT DOCUMENTS

538696 1/1978 Japan .

OTHER PUBLICATIONS

"Organic Chemistry", T. W. Graham Solomons, John Wiley & Sons, Inc., p. 757.
Journ. of Poly. Sci.", N. Ogata et al., vol. 11, pp. 2537-2545 (1973).
"Textbook of Polymer Sci.", F. W. Billmeyer, Jr., pp. 260-261 (1971).
Condensation Polymers", P. W. Morgan, p. 12 (1965).
"The American College Dictionary", Random House, Inc., N.Y., N.Y., 1958, p. 775.
"Advanced Organic Chemistry", Part B, pp. 256 & 323.

*Primary Examiner*—Hosea E. Taylor
*Assistant Examiner*—Amelia B. Yarbrough
*Attorney, Agent, or Firm*—J. F. Mudd; D. A. Stein

[57] ABSTRACT

There are described linear aromatic polyesters of a bisphenol and a dicarboxylic acid having terminal carboxylate ester substituents of an aliphatic monofunctional alcohol of 8 to 45 carbons. The polyesters have enhanced hydrolytic stability compared to conventional polyesters of bisphenol and a dicarboxylic acid. Low molecular weight polyesters of the invention have improved stability on processing compared to comparable conventional polyesters of a bisphenol and a dicarboxylic acid. Processes for preparing the polyesters are also disclosed.

20 Claims, No Drawings

POLYESTER COMPOSITION, PROCESS THEREFOR AND MOLDED ARTICLES THEREFROM

BACKGROUND OF THE INVENTION

This invention relates to improved linear aromatic polyesters of a bisphenol and a dicarboxylic acid. More particularly the invention relates to such polyesters containing as terminal substituents alkyl carboxylate ester groups derived from certain long chain aliphatic monofunctional alcohols.

Linear aromatic polyesters derived from dicarboxylic acids (especially aromatic dicarboxylic acids) and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when processed into useful articles using conventional techniques, e.g. injection molding techniques, provide properties superior to articles molded from other linear polyester compositions. For instance, aromatic polyesters are known to have a variety of useful properties, such as good tensile, properties, impact, and bending strengths, high thermal deformation and thermal decomposition temperatures, resistance to UV irradiation, and good electrical properties.

Although the aforementioned linear aromatic polyesters generally display excellent physical and chemical properties a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss of tensile strength which can occur when an aromatic polyester resin is molded and subsequently immersed in boiling water. This tendency may be explained, in part, by the hydrolysis of the ester linkages under these conditions. In any event, it is to be appreciated that sensitivity to moisture represents a significant problem in aromatic polyester resins that would significantly limit their commercial utility in applications such as in autoclaves or at elevated temperatures in humid atmospheres.

It has been proposed (according to T. Ueno et al., Japanese Patent Sho 53-8696, published Jan. 26, 1978) to enhance the hydrolytic stability of linear aromatic polyesters comprising bisphenol and dicarboxylic monomer residues by carrying out the preparation of the polyester from the bisphenol and dicarboxylic acid diaryl halide reactants in the presence of a monohydric phenolic compound such as p-tert. butyl phenol. The monofunctional phenolic compound reacts with terminal carbonyl halide substituents in the polyester to form p-tert. butyl phenyl carboxylate ester end groups. However, as is illustrated by data in Table I below, modification of the polyester to introduce terminal carboxylate ester groups derived from monofunctional phenols (such as p-tert. butyl phenol) does not enhance the hydrolytic stability to make the products attractive commercially.

As illustrated below the foregoing conventional polyesters when prepared at a low molecular weight, (for example, at a weight average molecular weight corresponding to an intrinsic viscosity of about 0.2 to less than about 0.5 dl/g. i.e. a weight average molecular weight of about 7,000 to less than about 24,000) are generally unstable on processing, e.g. processing by injection molding. This processing instability is evidenced by a significant loss in the polyester intrinsic viscosity and molecular weight during processing.

It is the object of the invention to prepare a structurally modified linear aromatic polyester comprising bisphenol and dicarboxylic acid residues which displays hydrolytic stability.

It is another object of the invention to prepare a structurally modified low molecular weight linear polyester comprising bisphenol and dicarboxylic acid residues of enhanced processing stability.

SUMMARY OF THE INVENTION

According to the invention a novel thermoplastic polyester is provided by an improvement in linear aromatic polyesters which comprise residues of bisphenols and dicarboxylic acids and in which the terminal residues of the polyester chain comprise a dicarboxylate acid residue. According to this improvement the end carboxylate group of said terminal dicarboxylic acid residue comprises a carboxylate ester of an aliphatic monofunctional alcohol of 8 to 45 carbon atoms.

The polyesters of bisphenol and dicarboxylic acid residues which in accordance with invention contain $C_8-C_{45}$ alkyl crboxylate ester terminal substituent are generally more resistant to hydrolysis, e.g. by neutral boiling water, than are corresponding polyesters of bisphenol and dicarboxylic acid residues containing conventional terminal carboxylate ester groups, for example the bisphenol-dicarboxylic acid polyesters of the aforementioned, Japanese Patent Sho 53-8696, of T. Ueno et al.

The invention also includes as a particular embodiment the present structurally modified polyesters which are prepared by a soluton polymerization technique and are of low molecular weight, i.e. have a weight average molecular weight corresponding to an intrinsic viscosity (as measured in a 0.5% by weight solution of the polyester in tetrachloroethane at 30° C.) of about 0.2 to less than about 0.5 dl/g. i.e. a weight average molecular weight of about 7000 to less than about 24,000. The present low molecular weight polyesters are substantially stable on processing i.e. remain substantially unchanged in molecular weight, on processing. This result is unexpected since comparable conventional low molecular weight polyesters (e.g. a p-tertiary butyl phenyl carboxylate ester-terminated polyester as disclosed by the aforementioned Japanese Patent Sho 53-8696) generally exhibit under comparable processing conditions a significant molecular weight loss as evidenced by a substantial loss in their intrinsic viscosity.

The present invention also includes processes for preparing the present polyester.

The invention includes a process for preparing the present polyester by reaction of the diacyl halide of the dicarboxylic acid, the bisphenol and the $C_8-C_{45}$ aliphatic monofunctional alcohol so that the $C_8-C_{45}$ monofunctional alcohol is reacted into the polyester when the latter is prepared by a solution polymerization technique.

The invention also includes a process for preparing the present polyester by transesterification reaction of a diaryl ester of the dicarboxylic acid, the bisphenol and the $C_8-C_{45}$ alcohol so that the $C_8-C_{45}$ alcohol is reacted into the polyester when the latter is prepared by a transesterification or melt polymerization technique.

DETAILED DESCRIPTION OF THE INVENTION AND PREFERRED EMBODIMENTS THEREOF

THE BISPHENOL COMPONENT

The bisphenol which can be employed to prepare the present polyesters are known compounds and include bisphenols and biphenols corresponding to the general formula:

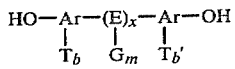

wherein Ar is aromatic, preferably containing 6–18 carbon atoms (including phenyl, biphenyl and naphthyl); G is alkyl, haloalkyl, aryl, haloaryl, alkylaryl, haloalkyaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—,

GN<; T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. Preferably G and E in the above structural formual when taken together do not form a cyclic substituent. The bisphenols generally contain 12 to about 30 carbon atoms, and preferably 12 to about 25 carbon atoms.

Typical examples of bisphenols having the foregoing formula include bisphenol-A, i.e. bis(4-hydroxyphenyl)-2,2-propane, b is (3-hydroxyphenyl)-1,2-ethane, bis(4-hydroxyphenyl-1,2-ethane, as well as the other bisphenols illustrated in G. Salee, U.S. Pat. No. 4,126,602 (issued Nov. 21, 1978) at column 2, line 68 to column 3, line 47, the subject matter of said patent being incorporated herein by reference. Representative biphenols include p,p'-biphenol and the other biphenols illustrated in the afroementioned U.S. Pat. No. 4,126,602 of G. Salee at column 3, lines 47–55. Mixtures of isomers of the above bisphenols and biphenols can also be used.

THE DICARBOXYLIC ACID COMPONENT

The dicarboxylic acids from which the present polyesters are prepared are also well known and can be represented by the formula:

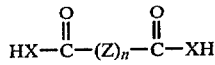

in which X is oxygen or sulfur, Z is alkylene, —Ar— or —Ar—Y—Ar— where Ar has the same definition as given with respect to the bisphenols, Y is an alkylene, of 1 to 10 carbons, haloalkylene, —O—, —S—, —SO—, —SO$_2$—, —SO$_3$—, —CO—,

or GN<; and n is 0 or 1.

Suitable dicarboxylic acids include aromatic dicarboxylic acids such as isophthalic acid and terephthalic acid, as well as the other aromatic dicarboxylic acids illustrated in the aforementioned U.S. Pat. No. 4,126,602 (of G. Salee) at column 4, lines 5–17.

Suitable aliphatic acids include oxalic acid, malonic acid, isodithiomalonic acid, and the other aliphatic dicarboxylic acids illustrated in the aforementioned U.S. Pat. No. 4,126,602 (of G. Salee) at column 4, lines 17–19. Aromatic acids are preferred. Of the aromatic acids isophthalic acid and terephthalic acid are especially preferred due to their availability and low cost. Most preferably, the dicarboxylic acid component comprises a mixture of about 75 to about 100 mol percent isophthalic acid and about 25 to about 0 mole percent terephthalic acid.

When the dicarboxylic acids used in preparing a polyester of the invention consist of both isophthalic and terephthalic acids in accordance with an especially preferred embodiment of the invention, a weight proportion of isophthalic to terephthalic acid residues in the polyester ranging from about 75:25 to about 90:10 provides an especially satisfactory result.

When the aforementioned improved solution polymerization process of the invention is employed to prepare the present polyester, the dicarboxylic acid reactant employed is a diacyl halide of the dicarboxylic acid, for example a diacyl bromide or a diacyl chloride of the dicarboxylic acid. Preferably a diacyl chloride is employed as the dicarboxylic acid reactant.

When the aforementioned improved transesterification polymerization process of the invention is employed to prepare the present polyester, the dicarboxylic acid reactant is generally a diaryl ester of the dicarboxylic acid.

The diaryl esters of the dicarboxylic acid employed as reactants in the present improved transesterification polymerization process are di-esters of the dicarboxylic acid with a monohydroxy aromatic compound of the benzene or naphthalene series containing 6 to 20 carbon atoms, such as phenol o, m or p-cresol, xylenol, a halophenol such as p-chlorophenol, 3,5-dibromophenol, a nitro phenol such as o-, m- or p-nitrophenol, 1-naphthol, 2-naphthol, 1-hydroxy-4-methyl naphthalene and the like. Preferably the ester reactant is a derivative of a monohydroxy aromatic hydrocarbon, more preferably a monohydroxy aromatic hydrocarbon of the benzene series, and especially is phenol itself. While the ester groups of the dicarboxylic acid ester reactant may be derived from different monohydroxy aromatic compounds, preferably both ester groups dicarboxylic acid ester reactant are derived from the same monohydroxy aromatic compound.

THE OPTIONAL MODIFIER COMPONENT

The present invention is preferably directed to the preparation of polyesters derived exclusively from a dicarboxylic acid and a bisphenol. However, it is also within the scope of the invention to prepare polyesters containing the residue of an aliphatic modifier, i.e. a glycol, incorporated into the structure of the polyester which also contains bisphenol and dicarboxylic acid residues. Such modified polyesters possess excellent engineering properties such as high impact strength and high modulus.

The aliphatic modifier is a reactive difunctional component which may be represented by the formula:

$$H_nD-A-D'H_n$$

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl alkylene-carboxyalkylene-carboxyalkyl, and poly(alkylene carboxyalkylene-carboxy)alkyl; and n is an integer from 1 to 2 with n being 2 when D and D' is N. Typical examples of aliphatic modifiers having the foregoing fomula include ethylene glycol, and other difunctional modifiers illustrated in the aforementioned U.S. Pat. No. 4,126,602 at Column 4, lines 55-66. Combinations of the above-described aliphatic modifiers can also be employed, usually to obtain special properties.

Preparation of polyesters of bisphenol and dicarboxylic acid residues modified by incorporation of residues of the aforementioned aliphatic modifiers are more particularly described by Hindersinn et al. U.S. Pat. No. 3,471,441, (the subject matter of which is incorporated herein by reference) wherein the aliphatic modifier, e.g. a glycol of 2-100 carbon atoms, is reacted via solution polymerization with a diacyl halide of a dicarboxylic acid and the resultant prepolymer is reacted with bisphenol by interfacial polymerization to obtain the modified polyester. Polyesters of bisphenol and a dicarboxylic which contain resiudes of such aliphatic modifiers, typically a glycol, and which are prepared by a transesterification polymerization reaction technique are described in British Pat. No. 924,697 to Imperial Chemicals Industries, issued Apr. 24, 1963 (see page 3, lines 12-26), F. Blascke et al., U.S. Pat. No. 3,399,170 issued Aug. 27, 1968 (see Col. 2, lines 14-16) and A. L. Lemper et al., U.S. Pat. No. 4,137,278 issued Jan. 30, 1979, the subject matter of these patents being incorporated herein by reference.

THE LONG CHAIN ALCOHOL COMPONENT

The long chain aliphatic monofunctional monohydroxy, alcohol reactant employed in the invention provides terminal long chain alkyl ester substituents in the polyester corresponding to the formula —COOR wherein R represents the $C_8$-$C_{45}$ alkyl residue of the long chain monofunctional aliphatic alcohol.

The aliphatic residue present int he monohydroxy aliphatic alcohol reactant to the invention (and in the terminal carboxylate ester group of the present polyester product) is generally saturated, i.e. is devoid of ethylenic or acetylenic unsaturation. The organic residue of the alcohol may contain aromatic substituents such as phenyl substituents and aliphatic ester substituents, e.g. straight and branched chain lower alkoxy groups (wherein "lower" indicates an alkyl group of 1 to 6 carbon atoms) in addition to hydrogen substituents but is devoid of substituents, e.g. hydroxy groups, which are capable of undergoing esterification in the esterification polymerization reaction employed to prepare the present polyesters.

Preferably the organic residue is entirely aliphatic in nature, i.e. is devoid of aromatic substituents.

Preferably the organic residue of the alcohol reactant contains in addition to carbon to carbon bonds only carbon to hydrogen bonds, i.e. the organic residue is preferably a hydrocarbon residue. The organic residue of the alcohol reactant may be cyclic but, preferably is an acyclic aliphatic residue. If acyclic, the organic residue of the alcohol may be a straight chain or branched chain alkyl group. Preferably the organic residue of the monohydroxy alcohol reactant is a straight chain aliphatic residue.

The hydroxy group of the monohydroxy alcohol reactant may be a primary, secondary or tertiary hydroxy group. Preferably a monohydroxy aliphatic alcohol reactant having a primary hydroxy substituent is employed.

The monohydroxy aliphatic alcohol reactant contains from 8 to 45 carbon atoms preferably from 9 to 40 carbon atoms. More preferably the aliphatic alcohol contains 12 to 30 carbon atoms, especially 15 to 20 carbon atoms.

The monohydroxy aliphatic alcohols employed as end-capping reagents in accordance with the invention are illustrated by the following representative examples:

n-octyl alcohol
c-octyl alcohol $$CH_3(CH)(CH_2)_5OH$$
$$|$$
$$CH_3$$

p-methyl benzyl alcohol
$(CH_3)_2C(CH_2)_{12}OH$
$CH_3(CH_2)_{11}C(CH_3)_2OH$
$CH_3O(CH_2)_{12}OH$
$CH_5(CH_2)_{14}OH$
n-nonyl alcohol
n-decyl alcohol
n-undecyl alcohol
n-dodecanol
n-pentadecanol
stearyl alcohol
n-eicosanol
$CH_3(CH_2)_{44}OH$
$CH_3(CH_2)_{29}OH$, i.e. n-tricontanol

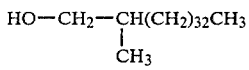

$CH_3(CH_2)_{39}OH$, i.e. n-tetracontanol

Mixtures of these and equivalent monohydroxy aliphatic alcohols can also be employed in the practice of the invention.

The present polyesters terminating in carboxylate ester groups of a $C_8$–$C_{45}$ long chain aliphatic monohydroxy alcohol can be prepared by procedures which are improvements according to the invention in the known techniques of solution polymerization (including interfacial polymerization) and transesterification or melt polymerization for preparing polyesters comprising bisphenol and dicarboxylic acid residues.

PREPARATION OF PRIOR ART SOLUTION POLYMERIZATION TECHNIQUES FOR POLYESTERS

In the known procedures for carrying out preparation according to the solution technique the diacyl halide of the dicarboxylic acid, and the bisphenol reactant are condensed desirably in the presence of a catalyst, e.g. a tertiary amine such as triethylamine, in the presence of an inert organic reaction solvent such as methylene chloride. In the interfacial polymerization modification of the latter solution technique the diacyl halide, dissolved in an organic liquid which is an inert solvent for the polyester to be formed is condensed in a polymerization esterification reaction with a metal phenolate of the bisphenol reactant, dissolved in a liquid which is immiscible with the solvent for the diacyl halide.

The known polyester preparatory procedures according to the solution or interfacial-modified solution polymerization techniques include the preparatory technique disclosed by Conix, U.S. Pat. No. 3,216,970, and the polymerization techniques described for preparation of linear aromatic polyesters comprising bisphenol and dicarboxylic monomer residues by P. W. Morgan in "Condensation Polymers" by Interfacial and Solution Methods, Interscience Publishers, 1965, Chapter VIII, particularly pages 332-364. The disclosure of the Conix patent and the Morgan textbook reference are incorporated herein by reference.

Alternate known solution polymerization techniques useful for preparing linear aromatic polyesters consisting essentially of bisphenol and dicarboxylic acid residues but which are modified by inclusion of residue of a difunctional aliphatic modified monomer of the type described hereinabove are described in the aforementioned U.S. Pat. No. 3,471,441 of Hindersinn et al., as well as in E. V. Gouinlock, Jr. et al. U.S. Pat. No. 4,051,106 and J. A. Pawlak et al. U.S. Pat. NO. 4,051,107. The subject matter of the Gouinlock, Jr. et al. and Pawlak et al. patents is also incorporated herein by reference.

PRIOR ART TRANSESTERIFICATION TECHNIQUES FOR PREPARATION OF POLYESTERS

In the conventional preparation of linear aromatic polyesters comprising bisphenol and dicarboxylic acid residues by transesterification polymerization, a mixture of the bisphenol and a dicarboxylic acid diaryl ester is heated, desirably under a substantially anhydrous inert atmosphere, e.g. of dry nitrogen, to a sufficiently elevated temperature, generally above about 100°, to liquify the reactants, i.e. provide a molten reaction mass. If desired, moreover the transesterification polymerization may be conducted at temperatures below the melting point of the reactants and product i.e. as a solid state polymerization reaction.

Generally the reaction mass contains an ester-interchange or transesterification catalyst of the type described herein below. In the ensuing transesterification polymerization reaction which may be accelerated by raising the reaction mass temperature to about 350° C. the aryl group of the diaryl ester is displaced by the bisphenol to form a monohydroxy aromatic compound, e.g. a phenol. The reaction pressure is normally diminished during the reaction, e.g. from atmospheric pressure to a subatmospheric pressure of about 0.1 mm of mercury or lower. In carrying out the reaction, provision is generally made for distillative removal of the mono-hydroxy aromatic compound to drive the reversible transesterification process to completion.

It is often desirable to carry out the transesterification preparation of the polyester in two stages, for example a low temperature or prepolymerization stage wherein the bisphenol and diaryl ester are transesterified at a temperature of from above about 100° to about 300° C., preferably at about 175° C. to about 300° C. and especially at about 175° to about 250° C. under the aforementioned conditions of reaction pressure to prepare a low molecular weight bispheol-dicarboxylic acid polyester (which may conveniently be termed a polyester prepolymer) having a relative intrinsic viscosity, e.g. of the order of about 0.1 to about 0.2 dl/g. The prepolymer is then conveniently heated at a somewhat higher reaction temperature, e.g. at about 150° to about 350° C., or higher temperature preferably at about 225° to about 350° C. and especially at about 250° to about 300° C. under the aforementioned condition of reaction pressure to complete the polymerization reaction. The latter reaction stage is conveniently designated the polymerization stage and, if desired, the latter stage can be carried out in a different reaction vessel from that employed to prepare the polyester prepolymer.

The ester-interchange catalyst conventionally employed in the foregoing transesterification polymerization preparation of linear aromatic bisphenol-polyesters include magnesium oxide, lead oxide, zinc oxide, antimony trioxide and alkoxides formed by reacting the alkali or alkaline earth metals, aluminum or titanium with an alcohol or a glycol, e.g. aluminum isopropoxide. Other suitable ester-interchange catalysts employed in the prior art include organic esters derived from ortho titanic acid, metal hydroxides such as lithium hydride and potassium borohydride, and alkali metal salts of dihydroxy-diaryl-alkanes such as the sodium salt of the bisphenol reactant employed in the polymerization.

The proportion of the aforementioned transesterification catalysts conventionally employed in preparing linear aromatic polyesters of bisphenols and dicarboxylic acids via transesterification is generally a catalytically effective amount, for example about 0.005 to about 2%, preferably about 0.01 to 1% by weight based on the combined weight of the weight of the bisphenol reactant and the dicarboxylic acid diaryl ester reactant. Further illustrations of suitable transesterification catalysts and suitable proportions thereof are given in the aforementioned British Pat. No. 924,697. The latter patent and aforementioned U.S. Pat. Nos. 3,399,170 and 4,137,278 illustrate the conventional preparation by transesterification polymerization of polyesters comprising bisphenol and dicarboxylic acid residues. The aforementioned type of two stage transesterification polymerization technique for preparing linear aromatic polyesters is described by G. Bier, *Polymer* 15 527-535 (1974) and in K. Eise et al. German Preliminary Application 2,232,877, the subject matter of the latter article and application being incorporated herein by reference.

THE SOLUTION PROCESS INVENTION

According to the improved solution polymerization process of the invention, the $C_8$-$C_{45}$ alcohol is reacted into the polyester, i.e. reacted with the diacyl halide concurrently with, or preferably prior to, the polymerization esterification reaction of the diacyl halide with the bisphenol.

In the concurrent mode of reaction of the $C_8$-$C_{45}$ alcohol, the alcohol is added to and allowed to react with the diacyl halide at the end, during, or desirably at the beginning of the polymerization esterification of the diacyl halide and the bisphenol reactant. In other words, the alcohol reactant of the invention is reacted with the diacyl halide either simultaneously with, or subsequent to, mixing of the bisphenol and the diacyl halide to commence the polymerization.

In the preferred embodiment, the alcohol reactant is contacted and reacted by esterification with the diacyl halide reactant to substantial completion prior to contact of the diacyl halide reactant with the bisphenol under essentially the same conditions, e.g. of temperature, pressure, solvent and catalyst, as are employed in the polymerization reaction. This preferred method provides a more complete reaction of the alcohol, i.e. a more complete conversion of the long chain alcohol to the desired long chain alkyl substituted carboxylate ester end group in the product polyester.

The foregoing embodiment is contrary to the practice of the prior art for reacting a linear aromatic polyester with a monofunctional hydroxy organic compound, e.g. p-tert.-butyl phenol, wherein the monofunctional hydroxy reagent is reacted with diacyl halide reactant concurrently with the poly-esterification reaction of said diacyl halide and the bisphenol.

The improved solution process is carried out employing essentially the same conditions, e.g. of temperature and pressure, the same solvents and esterification catalysts and the same polyester product recovery techniques as are employed in the known solution polymerization processes for preparing linear aromatic polyesters comprising bisphenol and dicarboxylic acid residues.

THE MELT PROCESS INVENTION

According to the improved transesterification or melt polymerization process of the invention, the $C_8$-$C_{45}$ alcohol is reacted into the polyester, i.e. reacted with the diaryl ester of the dicarboxylic acid concurrently with, or prior to, the transesterification polymerization reaction of the diaryl ester with the bisphenol.

In preparing the present polyester by the aforemention concurrent mode of reaction of the $C_8$-$C_{45}$ alcohol, the alcohol is added to and allowed to react with the diaryl ester at the end, during, or desirably at the beginning of the transesterification polymerization of the diaryl ester and the bisphenol reactant. In other words, the alcohol reactant of the invention is reacted with the diaryl ester either simultaneously with, or subsequent to, mixing of the bisphenol and the diaryl ester to commence the polymerization.

The improved transesterification process of the invention is carried out employing the same conditions, catalysts and polyester product recovery techniques as are employed in the known procedures for preparation of a linear aromatic polyester of bisphenol and dicarboxylic acid residue via a transesterification polymerization reaction employing a final maximum polymerization reaction temperature of about 150° to about 350° C. or higher as described hereinabove. Under the latter reaction temperature condition it has been discovered in accordance with the invention that an unsatisfactory conversion of the long chain alcohol to the desired long chain alkyl carboxylate group terminated polyester product (together with substantial amounts of an undesired olefin side product) are obtained when the duration of heating of the polymerization reaction mixture at the aforementioned final maximum polymerization reaction is of excessive duration.

While not wishing to be bound by any theoretical interpretation of a chemical reaction mechanism in regard to the present invention, it is believed that the excessive heating of the long chain alkyl carboxylate terminated polyester product at the latter maximum polymerization temperature effects an olefin generating pyrolytic decomposition reaction of the terminal ester group of the product of the type described by E. S. Gould "Mechanism and Structure in Organic Chemistry", Holt Rinehard and Winston, (1959), page 500, last line, the subject matter of which is incorporated by reference.

A preferred embodiment of the improved transesterification polymerization process of the invention contemplates improving the conversion of the alcohol to the polyester product and diminishing the formation of side product olefin by employing a duration of heating, i.e. a residence time, of the present polymerization reaction mass at the aforementioned final polymerization reaction temperature which is an effective residence time for the polymerization but is less than about 6 hours and is preferably about 1 to 4 hours. The curtailment of the residence time of the reaction mass at the aforementioned final maximum polymerization reaction temperature in accordance with the preferred embodiment of the invention improves the conversion of the long chain alcohol reactant to the desired long chain alkyl carboxylate end groups in the polyester product and also substantially diminishes the quantity of undesirable olefin side product.

The present improved transesterification polymerization procedure is preferably carried out employing the improved reaction technique described in the copending U.S. application of J. Rosenfeld and G. Salee, Ser. No. 45,461, filed of even date herewith. According to the latter application, the subject matter of which is incorporated herein by reference, improved conversion of the present alcohol reactant to the present polyester product is achieved in the present transesterification polymerization process by mixing the present diaryl ester reactant with the alcohol and reacting (via transesterification) the resultant mixture prior to any reaction of the diaryl ester with the bisphenol. Advantageously both the procedure of the latter application Ser. No. 45,461 and the above-described preferred embodiment of the present invention relating to use of a polymerization reaction mixture residence time of less than about six hours are employed together to obtain a maximum yield of the alkyl carboxylate ester group terminated polyester product of the invention.

Long chain alkyl carboxylate ester-end capped polyesters containing a substantial proportion of the ester end cap group (e.g. at least 5 mole percent, based on the total end groups in the polyester, corresponding to at least about 0.25 weight percent of the end cap group based on the weight of the polyester) can be obtained in the present solution and melt processes by employing a minor molar proportion (i.e. at least about 0.1 percent) of the long chain aliphatic monofunctional alcohol reactant based on the dicarboxylic acid reactant.

Preferably, the present polyesters should contain a minor hydrolysis-stabilizing weight proportion (based on the weight of the polyester) of the long chain alkyl carboxylate end group. While this proportion will vary somewhat depending upon the particular bisphenol and dicarboxylic acid residues in the polyester, generally, however, satisfactory results are achieved according to the invention when the proportion of the present end group in the polyester is above about 2 to about 10 weight percent, preferably is about 2.5 to about 5 weight percent (based on the weight of polyester). Proportions of more than 10 weight percent, e.g. 20 weight percent or more, of the end groups are also useful but may be uneconomic because of the amounts of the monofunctional alcohol required in their preparation.

Generally, to provide a polyester of enhanced hydrolytic stability the long chain monofunctional alcohol reactant is charged in the range of above about 2.5 to about 25 mole percent, preferably about 3.0 to about 10 mole percent and especially about 3.5 to about 8 mole percent based on the molar proportion of the dicarboxylic acid reactant.

In preparing the present polyesters, the proportions of dicarboxylic acid and bisphenol reactants used should be such as to provide for at least some carboxylate group termination in the polyester product (i.e. to provide a polyester in which the terminal residues of the polyester comprise a monomer residue of the dicarboxylic acid reactant). As is known, carboxylate group termination in linear aromatic polyesters comprising bisphenol and dicarboxylic monomer residues results from use of a molar proportion of the dicarboxylic acid reactant ranging from a stoichiometric excess of the dicarboxylic acid reactant (over the molar amount of bisphenol and any difunctional aliphatic modifier reactant employed) to a slight stoichiometric insufficiency of the dicarboxylic acid reactant corresponding to about a 5 mole percent stoichiometric excess of bisphenol and any difunctional aliphatic modifier reactant. Preferably, the polyesters of the invention are prepared employing a molar amount of dicarboxylic acid reactant which is about equivalent stoichiometrically to the molar amount of bisphenol and any difunctional aliphatic modifier reactant employed.

The monofunctional alcohol reactant of the invention acts as a molecular weight control agent on the polyester product of the invention. Hence, as the molar proportion of the alcohol based on the moles of dicarboxylic acid reactant which are charged to the polyester preparation process is increased the molecular weight of the product polyester is generally lowered. Thus, with use of higher proportions of the alcohol in preparing the present polyesters lower molecular weight polyesters are obtained.

The aforementioned higher molecular weight polyesters of the invention which are generally obtained with use of about 25 or less mole percent of the alcohol (based on the moles of dicarboxylic acid reactant) are characterized by a degree of polymierization (d.p.) of above 8 (a d.p. of 8 corresponding to the presence in the polyester of seven bisphenol residues and eight dicarboxylic acid residues) for examle, a degree of polymerization of up to 35 to 50 or higher. The aforementioned lower molecular weight polyesters which are generally obtained with use of more than 25 mole percent of the alcohol (based on the moles of dicarboxylic acid reactant) are characterized by d.p. of 8 or less, e.g. a d.p. of 3.

The polyester products of the invention have enhanced hydrolytic stability (and at low molecular weight, enhanced processing stability) copared to corresponding polyesters having conventional ester end groups, e.g. para-t-butyl phenyl carboxylate ester end groups.

The polyesters of the invention generally possess an ease of processability comparable to conventional polyesters. In view of their excellent properties the improved polyesters of the invention are useful in preparation of molded polyester articles such as molded automotive and electrical equipment parts.

The present products are distinctive from the fluoroalkyl carboxylate ester group terminated polyesters of improved hydrolytic stability which are in the copending U.S. application of G. Salee and J. C. Rosenfeld (Serial No. 45,463) filed of even date herewith (the subject matter of which is incorporated herein by reference). This is so since the present products are devoid of fluorine-substitution in the alkyl carboxylate ester end groups.

The polyesters of the invention may optionally contain other additives such as organic or inorganic fillers, flame retardants, tensile strength stabilizers and the like.

The fillers which may be used in polyester compositions of the invention are preferably particulate fillers such as particulate glass (e.g. chopped glass fiber, glass rovings, glass microballoons or microspheres and pulverulent glass) particulate clay, talc, mica, inorganic natural fibers, synthetic organic fibers, alumina, graphite, silica, calcium carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally the amount of particulate filler employed in the compositions of the invention is in the range of about 5 to about 70 weight percent, preferably about 5 to about 40 weight percent and especially about 8 to abut 30 weight percent based on the combined weight of the polyester and the diester additive. The filler employed is preferably inorganic. Generally a particularly good result is obtained employing a particulate glass filler especially glass fiber.

While the polyesters of the invention are inherently of enhanced hydrolytic stability, the polyester of the invention may also contain in admixture a polymeric additive which further stabilizes the polyester against hydrolysis. Particularly suitable hydrolysis stabilizers for the polyester include the polymeric reaction product of a styrene/maleic anhydride copolymer and a diene rubber as described in G. Salee, U.S. Pat. No.

4,126,602 issued Nov. 21, 1978, (the subject matter of which patent is incorporated herein by reference), polyphenylene sulfide as described in the copending U.S. application of G. Salee, Ser. No. 819,539, filed July 27, 1977, U.S. Ser. No. 863,556, filed Dec. 22, 1977, Ser. No. 863,555 filed Dec. 22, 1977, and Ser. No. 905,623, filed May 12, 1978 (the subject matter of which applications is incorporated herein by reference), linear aromatic polysulfonates of a bisphenol and a disulfonic acid (as described in the copending U.S. application of G. Salee and J. C. Rosenfeld, Ser. No. 921,026, filed June 30, 1978 (the subject matter of which is incorporated by reference), and the cross-linked acrylate-methacrylate polymer of the copending U.S. application of G. Salee, Ser. No. 920,891, filed June 30, 1978, (the subject matter of which is incorporated by reference).

As an optional additive which stabilizes the polyester against loss of tensile strength on ageing, the polyester of the invention may contain the perfluoroalkenoxy surface active compound described in the copending U.S. application of N. Dachs, Ser. No. 921,027, filed June 30, 1978, the subject matter of which is incorporated by reference.

Flame retardant additives which can also be employed as optional additives in the present polyester include the halogen-containing flame retardant agents of the copending U.S. applications of G. Salee, Ser. No. 863,556 and Ser. No. 863,381, both filed Dec. 22, 1978, the subject matter of said applications being incorporated herein by reference.

The improved long chain alkyl carboxylate ester group terminated polyesters of the invention are readily processed to films and molded articles employing equipment conventional in the processing of thermoplastics, e.g. injection and extrusion molding machines.

Typically the polyester (and if desired one or more of the aforementioned filler materials or additives in physical admixture withthe polyester) is subjected to milling in molten condition and is then pressed as a film or molded (by an extrusion or preferably injection molding technique) employing the appropriate processing apparatus. If injection molding of the present composition is desired, it may be desirable to substitute an extrusion molding step for processing of the molten composition in a mill prior to the final injection molding of the composition. Films, as well as various shaped molded articles such as rods, bars, ring, etc. can be prepared from the present thermoplastic polyesters.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts, proportions and percentages are by weight.

EXAMPLE 1 (Control)

The following Example illustrates the preparation (by a solution polymerization technique) and properties of linear aromatic polyester comprising Bisphenol-A isophthalate and terephthalate residues (in a molar proportion of about 50:75:25 respectively) wherein the terminal carboxylate groups comprise conventional p-tert. butyl phenyl carboxylate ester groups.

Bisphenol-A (21657 g., 94.835 moles), isophthaloyl chloride (14617 g., 72 moles), terephthaloyl chloride (4873 g., 24 moles), p-tert. butyl phenol (a polyester chain termination agent, 350 g., 2.33 moles corresponding to 2.4 mole percent based on the moles of isphthaloyl and terephthaloyl chloride) and 500 lbs. of dry methylene chloride are charged to a dry 100 gal. reactor under a blanket of dry nitrogen. Triethylamine catalyst (197.76 moles) is charged under nitrogen to a dry 50 gal. addition vessel connected to the aforementioned 100 gal. reactor. Over a period of 2 hours and 22 minutes the catalyst is added at steady rate to the reaction mixture in the 100 gal. reactor which is maintained at 20°–24° under agitation. Upon completion of addition of the catalyst, the reaction mixture is agitated for 3 hours at 18°–20° to complete the polymerization. The product is recovered and dried substantially as described in Example 3 below. The product which has an intrinsic viscosity of 0.64 dl/g. (determined in a 0.5% solution of the polyester in symmetrical tetrachloroethane at 30°) is a bisphenol-A-isophthalate-terephthalate polyester having a molar ratio of isophthalic acid monomer residues to terephthalic acid monomer residues of about 75:25 having p-t-butyl phenyl carboxylate ester substituents as carboxylate end groups of the polyester (the product contains about 50 mole percent of the later ester end group based on the total end groups of the polyester).

The product is compacted by being milled in molten condition for 2.5–3.0 minutes in a Farrell Mill (operating at a front roll temperature of 450° F., a back roll temperature of 425° F. and a roll speed of 45 rpm) and is then injection molded employing a New Britain 75 injection molding apparatus operating under the following conditions:

| Barrel Temperature | 630° F. |
|---|---|
| Mold Temperature | 239° F. |
| Injection Pressure | 20,000 psi |

The injection molded product, which has an intrinsic viscosity of 0.53 dl/g. (determined form a 0.5% solution of the polyester in symmetrical tetrachloroethane at 30°) is tested for tensile strength and modulus. Samples of the molded product are immersed in boiling water for about one week and the tensile strength and modulus of the resultant product after immersion are measured and compared to the tensile strength and modulus of the product prior to determine the hydrolytic stability of the product as measured by loss in product tensile strength on immersion. This data and the foregoing comparison is presented in Table I below.

EXAMPLE 2 (Control)

The following Example illustrates the preparation of a conventional low molecular weight bisphenol-A-isophthalate-terephthalate linear aromatic polyester and its instability on processing.

The procedure of Example 1 is repeated substantially as described except that the proportions of the isophthaloyl chloride and terephthaloyl chloride reactant are slightly altered to provide a polyester having a molar ratio of isophthalate residues to terephthalate residues of 85:15, instead of 75:25 as in the Example 1 product, (such difference in the ratio of dicarboxylic acid residues in the present polyesters is not considered to affect substantially the stability of the polyester on processing).

The intrinsic viscosity (measured as previously described) of the product which contains conventional p-tert-butyl phenyl carboxylate ester end groups is 0.46. dl/g.

The product (which does not require compaction prior to molding) is molded in Arburg injection molding apparatus operating under the following conditions.

| Barrel Temperature | 550° F. |
|---|---|
| Mold Temperature | 150° F. |
| Injection Pressure | 13,200 psi |

The product after injection molding has an intrinsic viscosity of 0.39 dl/g. indicating a decrease in molecular weight of the product on processing.

The intrinsic viscosity of a linear polymer is a known measure of the polymer molecular weight (as more particularly desired by F. W. Billmeyer Jr. "Textbook of Polymer Science", Wiley-Interscience, Second Edition, 1971, pages 84–89, the subject of which is incorporated herein by reference). Accordingly, the decrease of intrinsic viscosity of the present linear aromatic polyester from 0.46 dl/g. to 0.39 dl/g. on processing illustrates that conventional linear aromatic polyesters comprising bisphenol-A, isophthalate and terephthalate residues are relatively unstable, i.e. decrease in molecular weight on processing when the molecular weight of the polyester is low, i.e. when said polyesters have an intrinsic viscosity from about 0.2 dl/g. (corresponding to a number average molecular weight of about 7000) to less than about 0.5 dl/g. (corresponding to a weight average molecular weight of about 24,000).

The molded product has a heat distortion temperature (264 psi) of 141.5° C. (287° F.) and a notched Izod impact strength of 1.02 ft-lbs/in.

EXAMPLE 3

The following Example illustrates the preparation of a Bisphenol-A-isophthalate-terephthalate polyester of the invention (having residues of Bisphenol-A isophthalic and terephthalic acid in the molar ratio of about 50:75:25) employing a solution polymerization technique.

Isophthaloyl chloride (228.4 gm., 1.125 moles), terephthaloyl chloride (81.6 gm., 0.402 moles), stearyl alcohol (14.6 gm., 0.054 moles) and 3 liters of methylene chloride solvent are charged under a blanket of dry nitrogen gas to a 5 liter Morton flask equipped with a mechanical agitation device and an addition funnel. The mixture is agitated at ambient temperature to dissolve all solid reactants. Then 5.5 gms. (0.054 moles) of triethylamine catalyst is added rapidly to the mixture which is agitated for about 16 hours to complete the esterification reaction between the alcohol and the diacyl halides. Upon completion of this reaction 342.6 gm. (1.50 moles) bisphenol-A is added to the reaction mass. Additional triethylamine (312.9 g., 3.09 moles) is gradually charged to the reaction mixture, over a period of approximately two hours, at 15° to 25°.

On completion of the addition, the reaction mixture is agitated for about 2 hours. The reaction mixture is transferred to a 5 liter separating flask equipped with a mechanical agitator. To the reaction mass is added a mixture of 900 ml. of water and 20 ml. concentrated aqueous hydrochloric acid with vigorous agitation. The acidified mass is allowed to separate into an organic layer and an aqueous layer and the aqueous layer is separated. The organic layer is then washed with distilled water repeatedly until the wash water is free of chloride ion. The organic layer is filtered through a fritted glass funnel containing 50 gms. of a filter aid to clarify the organic layer filtrate.

The polyester product is precipitated from the filtrate by gradual addition of isopropanol with agitation and substantially all of the methylene chloride solvent is removed from the filtrate by distillation.

The product polyester is recovered by filtration. The white granular polymer is air dried, and then dried in a vacuum oven at about 100° C. for several hours.

The intrinsic viscosity of the product prior to processing is 0.47 dl/g. The polyester product contains about 2.90 weight percent stearyl carboxylate ester end groups (based on the weight of the polyester). The molar proportion of stearyl carboxylate ester end groups in the product (based on total end groups in the product) is about the same as the molar proportion of p-tertiary butyl phenyl carboxylate ester end groups in the product of Control Example 1.

The dry product is compacted in a Farrell Mill (front roll temperature 450° F., back roll temperature 410° F.). The milled product (having an intrinsic viscosity of 0.48 dl/g. is then processed by injection molding employing an Arburg molding apparatus operating under the following operating conditions.

| Barrel Temperature | 580° F. |
|---|---|
| Mold Temperature | 250° F. |
| Injection Pressure | 16,650 psi |

The intrinsic viscosity of the processed polyester is 0.46 dl/g. In other words, in processing the intrinsic viscosity of the product changed only from 0.47 dl/g. (the intrinsic viscosity of the polyester before processing) to 0.46 dl/g. (the intrinsic visosity of polyester after processing). Accordingly, the foregoing slight change in product intrinsic viscosity in processing (i.e. 0.01 dl/g.) indicates that the present product is substantially stable on processing in comparison to the comparable conventional polyester of Control Example 2 (wherein the corresponding change in intrinsic viscosity on processing is 0.07 dl/g.).

The present molded product has a heat distortion temperature (at 264 psi) of 146.5° (295.7° F.) and a notched Izod impact strength of 4.3 ft-lbs/in.

The molded product is tested for hydrolytic stability substantially as described in Example 1. The results of this test are compared to the corresponding test results of Example 1, product in Table I below.

EXAMPLE 4 (Comparative Example)

The procedure of Example 3 is repeated substantially as described in preparing a polyester of Bisphenol-A, isophthalic acid and terephthalic acid (having the same bisphenol and dicarboxylic acid residue ratios as in the Example 3 product) employing 228.4 g. (1.125 moles) of isophthaloyl chloride, 76.1 g. (0.375 moles) of terephthaloyl chloride, 338.5 g (1.48 moles) of Bisphenol-A, and only 9.71 g. (0.0359 moles) of stearyl alcohol, i.e. a smaller proportion of stearyl alcohol than that employed in Example 3. The resultant polyester product which has an intrinsic viscosity of 0.49 dl/g. is compacted in a Haake extrusion apparatus operating under the following conditions.

| RPM | Zone 1 Temp. | Zone 2 Temp. | Zone 3 Temp. | Zone 4 Temp. | Die Melt Temp. | Torque Torque | Amp. |
|---|---|---|---|---|---|---|---|
| 100 | 290° | 290° | 290° | 290° | 300° | 2000-3000 m.-g. | 15-20 |

The compacted product which has an intrinsic viscosity of 0.49 dl/g. is injection molded in an Arburg injection molding machine operating under the following conditions:

| | |
|---|---|
| Barrel Temperature | 580° F. |
| Mold Temperature | 250° F. |
| Injection Pressure | 17,760 psi |

The molded product samples have an intrinsic viscosity of 0.46 dl/g. (corresponding to a decrease of 0.03 dl/g. from the product intrinsic viscosity prior to processing).

The product contains 1.98 weight percent of stearyl carboxylate ester end groups (based on the weight of the polyester product).

The molded samples are tested for hydrolytic stability substantially as described in Example 1. The results of these tests are compared to the corresponding test results of the products of Examples 1 and 3 in the Table I below.

TABLE I

| | EXAMPLE 1 (Control) | EXAMPLE 3 | EXAMPLE 4 (Comparative Ex.) |
|---|---|---|---|
| Weight Percent Stearyl Carboxylate Ester End Group in polyesters | — | 2.90% | 1.98% |
| Tensile Strength (of Processed Polyester Prior to Boiling Water Immersion) | 9900 psi | 10,000 psi | 9800 psi |
| Tensile Modulus (of Processed Polyester Prior to Boiling Water Immersion) | 2.90 psi × 10$^5$ | 3.47 psi × 10$^5$ | 3.13 psi × 10$^5$ |
| Tensile Strength (of Processed Polyester Subsequent to Immersion in Boiling Water) | 1900 psi | 6800 psi | 2100 psi |
| Tensile Modulus (of Processed Polyester Subsequent to Immersion in Boiling Water) | 3.21 psi × 10$^5$ | 3.27 psi × 10$^5$ | 3.68 psi × 10$^5$ |

Comparison of the data of Table 1 illustrates that a polyester of the invention (Example 3) containing more than about 2 weight percent of long chain alkyl carboxylate end groups is effectively stabilizes against hydrolysis by water since the retention of tensile strength by the polyester is about 68% on one week immersion in boiling water. In contrast a comparable polyester (Control Example 1) containing a similar proportion of conventional p-tert. butyl phenyl carboxylate ester end groups retains only about 19% of the original polyester tensile strength after comparable boiling water immersion. Similarly a comparable polyester (Example 4) containing less than 2 weight percent of the present end group retains only about 21% of the original polyester tensil strength on comparable immersion in boiling water.

EXAMPLE 5

The procedure of Example 3 is repeated in reacting 228.4 g. (1.125 moles) of isphthaloyl chloride, 81.6 g. (0.402 moles) of terephthaloyl chloride, 14.61 g. (0.054 moles) of stearyl alcohol and 342.6 g. (1.50 moles) of Bisphenol-A. There is obtained an excellent polyester product having an intrinsic viscosity of 0.52 dl/g. and containing about 2.9 weight percent stearyl carboxylate end groups based on the weight of the polyester. The product is compacted by extrusion and injection molded substantially according to the procedure of Example 1. The intrinsic viscosity of the product after molding is 0.51 dl/g. The product possesses excellent hydrolytic stability substantially similar to that of the product of Example 3. The processability of the product which is similar to that of a conventional Bisphenol-A-isophthalate-terephthalate polyester is also excellent.

The following Examples 6-9, illustrate preparation of $C_8$-$C_{45}$ alkyl carboxylate ester end groups containing polyester of a bisphenol and a dicarboxylic acid by a transesterification, i.e. melt polymerization technique.

Example 7 illustrates a preferred transesterification polymerization preparatory process employing the pre-reaction process improvements of the aforementioned U.S. Application Ser. No. 45,461 of G. Salee and J. C. Rosenfeld.

Examples 8 and 9 illustrate preferred use of the latter improvement together with the preferred process improvement of this invention, namely employing diminished duration of heating of the polymerization mass at the final polymerization reaction temperature.

Example 6 illustrates the transesterification preparatory process omitting the foregoing two preferred process improvement steps.

EXAMPLE 6

Bisphenol A (1084.9 g., 4.75 moles) diphenyl isophthalate (1146 g., 3.60 moles) diphenyl terephthalate (382 g., 1.20 moles) and stearyl alcohol (25.47 g., 0.096 mole corresponding to 2 mole percent based on total molar quantity of the diphenyl ester reactants) are each dried for about 16 hours at 70° in a vacuum oven and charged to five liter reaction vessel under dry nitrogen. The mixture is heated with agitation over a period of 1.2 hours to about 173° to form a molten mass. About 4.8 cc. of a solution of lithium phenoxide in dry tetrahydrofuran (which is prepared by dissolving metallic lithium in phenol in dry tetrahydrofurn and which contains about 0.3 g., 0.003 mole of lithium phenoxide) is charged as transesterification catalyst to the molten mass. Over a period of about 1.5 hours the reaction mixture temperature is gradually raised to 215° and the reaction mixture pressure is diminished from atmospheric pressure to a pressure of about 0.1 mm. of mercury as phenol which is displaced from the diphenyl ester reactants distilled from the reaction mixture. The phenolic distillate is condensed, cooled to ambient temperature and reserved for analysis as described below. After about 90% of the theoretical amount of phenol expected from the polymerization has been collected, the reaction mass which consists essentially of a low molecular weight bisphenol-isophthalate-terephthalate polyester, i.e. a polyester prepolymer, is cooled to ambient temperature. The intrinsic viscosity of the prepolymer mass which is a light yellow brittle solid is about 0.14 dl/g. (as determined at 30° from a 0.5% solution of the prepolymer product in symmetrical tetrachloroethane) corresponding to a weight average molecular weight of about 7000. The number average molecular weight of the prepolymer is about 3500.

About 1500 g. of the aforementioned prepolymer product are pulverized and dried for about 16 hours in a vacuum oven and charged to a 2 gallon oil bath heated reaction vessel under a blanket of dry nitrogen gas to complete the polymerization reaction. Over a period of 1.5 hours the reaction mass is heated with agitation to a temperature of 290° while the reaction mixture pressure is decreased from atmospherid pressure of about 0.55 mm. of mercury and the phenol which is displaced in the reaction is distilled from the reaction mixture and collected as previously described. The polymerization reaction is continued for an additional 6.5 hours at a temperature of about 290°–300° and a diminished pressure of about 0.6 to 0.7 mm. of mercury. Upon completion of the reaction, the reaction vessel is gradually flooded with dry nitrogen gas at atmospheric pressure and the product polymer is recovered and allowed to cool to ambient temperature.

There is recovered about 1316.9 g. of a bisphenoisophthalate-terephthalate polyester wherein the molar ratio of isophthalic acid monomer residues to terephthalic acid monomer residues is about 75:25. The product contains about a stoichiometric molar equivalent proportion of hydroxy end groups and carboxylate ester end groups. The carboxylate end groups of the polyester consist of phenyl carboxylate ester end groups of the formula $C_6H_5OCO-$, (which are the conventional ester end groups in bisphenol-dicarboxylic acid polyester prepared by the transesterification polymerization reaction of a bisphenol and a dicarboxylic acid diphenyl ester) and stearyl carboxylate ester end groups of the formula $n-C_{18}H_{37}OCO-$. About 25 mole percent of the total end groups (i.e. $-OH$, $C_6H_5OCO-$, and $n-C_{18}H_{37}OCO-$ end groups) are stearyl oxy carbonyl ester end groups.

The product polyester is a clear yellow, mechnically resilient resin having an intrinsic viscosity of 0.56 dl/g., determined as previously described and a corresponding weight average molecular weight of about 26,000. The number average molecular weight of the product is about 12,000. The proportin of stearyl carboxylate end groups in the polyester is about 25 mole percent based on the total number of end groups in the polyester. The stearyl carboxylate end groups constitutes 1.18% by weight of the weight of the polyester.

On injection molding in an Arburg 211E/150 injection molding apparatus, the product polyester exhibits excellent processability similar to that of a comparable conventional bispheno-isophthalate-terephthalate polyester prepared by transesterification.

The phenolic distillates obtained during the aforementioned preparation of the prepolymer and in the subsequent polymerization reaction are separately analyzed quantitatively by gas liquid chromatography. In addition to phenol, the phenolic distillate of the prepolymer preparatory reaction contains 2.52 g. corresponding to 9.7 mole percent of the stearyl alcohol charged. In addition to phenol, the phenolic distillate recovered in the polyermization reaction contains 0.15 g. of stearyl alcohol corresponding to 0.6 mole percent of the stearyl alcohol charged. The total loss of unreacted stearyl alcohol overhead in the reaction is thus about 10.3 mole percent (or weight percent) of the stearyl alcohol charged.

In addition to stearyl alcohol values the phenolic distillate recovered in the polymerization reaction also contains 4.83 g. of 1-octadecene (formed by decomposition of the stearyl carboxylate ester end groups in the product). No octadecene is detected in the phenolic distillate recovered from the prepolymer preparatory reaction. The amount of loctadecene in the phenolic distillate of the polymerization reaction indicates an additional loss of about 18.6 mole percent of stearyl end groups (computed as a loss of the stearyl alcohol charged) via decomposition of the product 1-octadecene. The total mole percent loss in stearyl carboxylate ester end groups from the product based on stearyl alcohol charged (computed as the sum of moles of stearyl alcohol lost by entrainment and moles of stearyl alcohol corresponding to 1-octadecene based on moles of stearyl alcohol charged) is 28.9% corresponding to a molar conversion of stearyl alcohol to stearyl ester end groups of about 71.1%. The results of this Example are presented in Table II below.

EXAMPLE 7

The procedure of Example 6 is repeated substantially as described except that a mixture of the diphenyl isophthalate (1146 g., 3.60 mole), the diphenyl terephthalate (382 g., 1.20 moles) and the stearyl alcohol (28.57 g., 0.106 mole corresponding to 2.2 mole percent based on the total molar quantity of the diphenyl ester reactants) comparable to that in Example 6 is transesterified in the presence of the catalyst of Example 6 prior to addition of the bisphenol-A reactant (1084 g., 4.75 moles). Thus, a mixture of diphenyl isophthalate, diphenyl terephthalate and stearyl alcohol is charged under dry nitrogen gas to the five liter reaction vessel of Example 6 and melted by heat with agitation to 170°. After addition of the Example 6 catalyst, the temperature of the reaction mixture is gradually raised to 204°–209° and the reaction pressure is diminished from atmospheric pressure to about 0.18 mm. to 0.35 mm of mercury. The reaction mass is then agitated at the latter conditions of temperature and pressure while phenol which is displaced by the transesterification reaction of the stearyl alcohol with the diphenyl ester reactants is removed overhead, condensed and collected as in Example 6. After about 17 minutes, the latter transesterification reaction is substantially complete (as indicated by cessation of distillation of phenol overhead from the reaction mixture). About 7.9 g of phenolic distillate are recovered during the reaction of the diphenyl esters and the stearyl alcohol. The reaction mixture is returned to atmospheric pressure by flooding with dry nitrogen according to the procedure in Example 6 and the bisphenol-A reactant of Example 6 is added to the reaction mixture. The reaction mixture is heated to a temperature of about 220° while the reaction mixture pressure is gradually lowered to about 0.2 mm. of mercury and maintained at the latter conditions of temperature and pressure to prepare the polyester prepolymer. About 808 g. of phenolic distillate are collected during the formation of the polyester prepolymer. About 1703 g. of prepolymer, similar to that obtained in Example 6, are recovered in accordance with the procedure of Example 6. The intrinsic viscosity of the prepolymer is 0.15 dl/g. determined as described in Example 6 (corresponding to a weight average molecular weight of about 7000). The number average molecular weight of the prepolymer is about 13,500.

The procedure employed in the final polymerizaton stage is substantially as described in Example 6 except that the polymerization reaction mixture is maintained at about 290°–300° under a diminished pressure of about 0.6 to about 0.7 mm. of mercury for about 9 hours instead of 6.5 hours as in Example 6.

The product resin (1301.6 g.) which is recovered substantially as in Example 6 is a clear yellow mechanically resilient bisphenol-isophthalate-terephthalate containing about the same molar proportions of monomer residues and end groups as that of Example 6. The intrinsic viscosity of the product is about 0.57 dl/g. determined as previously described corresponding to a weight average molecular weight of the product is 28,000. The number average molecular weight of the product is about 12,800. The product polyester contains about 23.8 mole percent stearyl carboxylate end groups based on the total end groups in the polyester.

On injection molding in an Arburg 211E/150 injection molding apparatus, the product polyester exhibits excellent processability substantially similar to that of the product in Example 6.

The phenolic distillates obtained during transesterification reaction of the stearyl alcohol with the diphenyl ester reactants, during the preparation of the polyester prepolymer and during the subsequent polymerization stage, are analyzed by gas liquid chromatography as described in Example 6 for unreacted stearyl alcohol and for 1-octadecene.

The phenolic distillate obtained during the transesterification reaction of stearyl alcohol and the diphenyl ester reactants contains 0.0014 g. of stearyl alcohol (corresponding to a loss of stearyl alcohol based on stearyl alcohol charged of 0.005 mole percent).

The phenolic distillate obtained during the polyester prepolymer preparation reaction contains substantially no stearyl alcohol.

The phenolic distillate obtained during the final polymerization stage contained 0.0823 g. of stearyl alcohol (corresponding to a loss of stearyl alcohol based on stearyl alcohol charged of 0.27 mole percent).

The phenolic distillate obtained during the reaction of stearyl alcohol with the diphenyl esters and the phenolic distillate obtained during prepolymer formation are combined for the analysis for 1-octadecene. The amount of 1-octadecene in this combined distillate is 0.0029 g. (corresponding to a mole percent loss of product stearyl carboxylate end groups as 1-octadecene, based on stearyl alcohol charged, of 0.01%).

The phenolic distillate obtained in the fnal polymerization reaction corresponds to a mole percent loss of product stearyl carboxylate ester end groups as 1-octadecene, based on stearyl alcohol charged of 35.8%.

The results of this Example are compared with the corresponding results of Example 6 in Table II below.

EXAMPLE 8

The procedure of Example 7 is repeated substantially as described except that a mixture of diphenyl isophthalate (1146 g., 3.60 moles) diphenyl terephthalate (382 g., 1.2 moles) and stearyl alcohol (45.93 g., 0.1698 mole corresponding to 3.54 mole percent of the total molar quantity of the diphenyl ester reactants) is transesterified in the presence of the catalyst prior to addition of the bisphenol (1076 g., 4.72 moles) and the term of heating of the polymerization mass at the polymerization temperature of about 290°–302° is reduced from about 9 hours to about 4 hours employing a diminished pressure, 0.95 mm. to 1.55 mm. of mercury, comparable to that employed in Example 7.

The reaction of the stearyl alcohol and the diphenyl isophthalate and terephthalate is carried out for about 20 minutes under conditions comparable to those of the corresponding reaction in Example 7, namely at a temperature of about 196°–204° with the reaction pressure being gradually diminished from atmospheric pressure to a subatmospheric pressure of about 0.13 mm. of mercury.

The subject preparation of the polyester prepolymer (having an intrinsic viscosity of about 0.36 dl/g) is carried out for 45 minutes at conditions comparable to those employed in Example 7, namely at a temperature of about 181° to 215° with the reaction pressure being gradually diminished from atmospheric pressure to a subatmospheric pressure of about 0.18 mm. of mercury.

There is obtained an excellent polyester product (1196.8 g.) having an intrinsic viscosity of about 0.36 dl/g. determined as previously described corresponding to a weight average molecular weight of about 15,000. The number average molecular weight of the product is about 6940.

The proportion of difunctional monomer residues in the product is substantially the same as in the product of Example 7. The product contains about 29.3 mole percent stearyl oxy carbonyl ester, i.e. stearyl carboxylate ester, end groups based on the total end groups in the polyester.

The phenolic distillate recovered during the reaction of the stearyl alcohol and the diphenyl ester reactants prior to addition of the bisphenol A, the phenolic distillate obtained during preparation of the prepolymer, and the phenolic distillate obtained during the final polymerization stage are analyzed for stearyl alcohol and 1-octadecene. The mole percent loss of stearyl groups as unreacted stearyl alcohol and as 1-octadecene are determined as in the preceding Example. These results are compared with the corresponding results in Examples 6 and 7 in Table II below.

EXAMPLE 9

In this Example the procedure of Example 7 is repeated substantially as described except that a mixture of diphenyl isophthalate (1146 g., 3.6 moles), diphenyl terephthalate (382 g., 1.2 moles) and stearyl alcohol (37.3 g., 0138 mole corresponding to a mole percent of the total molar quantity of the diphenyl ester reactants) is transesterified in the presence of the catalyst prior to addition of the bisphenol (1080 g., 4.73 mole) and the term of heating of the polymerization mass at the polymerization mass at the polymerization temperature of about 291°-299° is reduced from about 9 hours to about 2 hours employing a diminished pressure, about 0.55 mm. to about 2.05 mm. of mercury, comparable to that in Example 7.

The reaction of the stearyl alcohol and the diphenyl isophthalate and terephthalate is carried out for about 25 minutes under conditions comparable to those of the corresponding reaction in Example 7 namely at a temperature of about 185°-202° with the reaction pressure being gradually diminished from atmospheric pressure to a substmospheric pressure of about 55 mm. of mercury.

The subsequent preparation of the polyester prepolymer (having an intrinsic viscosity of 0.158 dl/g.) is also carried out for 85 minutes at conditions comparable to those employed in Example 7, namely at a temperature of about 168°-225° with the reaction pressure being gradually diminished from atmospheric pressure to a subatmospheric pressure of about 0.5 mm. of mercury.

There is obtained an excellent yield of polyester product having an intrinsic viscosity of about 0.45 dl/g. determined as previously described, corresponding to a weight average molecular weight of about 18,000. The number average molecular weight of the product is about 8585.

The proportion of difunctional monomer residues in the product is substantially the same as in the product of Example 7. The product contains about 29.3 mole percent stearyl carboxylate ester end groups based on the total end groups in the polyester.

The results of this Example are also compared with corresponding results of the previous Example in Table II below.

TABLE II

| | EXAMPLE 6 | EXAMPLE 7 | EXAMPLE 8 | EXAMPLE 9 |
|---|---|---|---|---|
| Intrinsic Viscosity of Product (dl/g.); (Number Average Molecular Weight of Product) | 0.56(26,000) | 0.57(28,000) | 0.36(15,000) | 0.45(18,000) |
| Moles of Stearyl Alcohol Charged | 0.096 | 0.106 | 0.1698 | 0.138 |
| Mole Percent of Stearyl Alcohol Charged (Based on Moles of Diphenyl Isophthalate and Diphenyl Terephthalate Charged) | 2.0% | 2.2% | 3.54% | 2.87% |
| Stearyl Alcohol (Mole Percent based on Stearyl Alcohol Charged) in Phenolic Distillate: | | | | |
| Obtained during reaction of Stearyl Alcohol & Diphenyl Esters prior to addition of Bisphenol-A | — | 0.005% | 0.007% | 0.006% |
| Obtained during Polyester Prepolymer Preparation | 9.7% | 0.0% | 0.376% | 0.121% |
| Obtained during Final Polymerization Stage | 0.6% | 0.29% | 0.22% | 0.212% |
| Combined Loss of Stearyl Alcohol as Unreacted Stearyl Alcohol in Phenolic Distillates (as Mole Percent Stearyl Alcohol based on Stearyl Alcohol Charged) | 10.3% | 0.3% | 0.6% | 0.34% |
| Duration of Heating (i.e. Residence Time) of Polymerization Mass at Maximum Polymerization Temperature, i.e. at about 290°-300°, in Final Polymerization Stage. | 6.5 hours | 9 hours | 4 hours | 2 hours |
| Mole Percent Loss in Stearyl Carboxylate End Groups from Product as 1-octadecene in Phenolic Distillate (based on Stearyl Alcohol Charged) | | | | |
| As 1-octadecene obtained during reaction of Stearyl Alcohol and Diphenyl Isophthalate & Diphenyl Terephthalate prior to addition of Bisphenol-A | — | { 0.01% } | { 0.22% } | 0.005% |
| As 1-octadecene obtained during Polyester Prepolymer preparation | 0 | | | 0.025% |
| As 1-octadecene obtained during Final Polymerization Stage | 18.6% | 35.8% | 12.2% | 13.44% |
| Combined Loss of Stearyl Carboxylate Ester End Groups from Product as 1-octadecene in Phenolic Distillates based on Stearyl Alcohol Charged) | 18.6% | 35.8% | 12.4% | 13.47% |
| Total Loss of Stearyl Carboxylate Ester End Groups from Product as Stearyl Alcohol and 1-octadecene in Phenolic Distillates (as Mole Percent Stearyl Alcohol based on Stearyl Alcohol charged) | 28.9% | 36.1%(18.9%)* | 13.0% | 73.8% |
| Mole Percent Conversion of Stearyl Alcohol charged to Stearyl Carboxylate Ester End Groups in Product | 71.1% | 63.9%(81.1%)* | 87.0% | 86.2% |
| Mole Percent Stearyl Carboxylate Ester End Groups in Product (based | | | | |

TABLE II-continued

|  | EXAMPLE 6 | EXAMPLE 7 | EXAMPLE 8 | EXAMPLE 9 |
|---|---|---|---|---|
| on total end groups in product) | 25% | 23.8%(30%)* | 29.3% | 29.3% |
| Weight Percent Stearyl Carboxylate Ester End Groups in Product (based on the Weight of the Polyester Product) | 1.18% | 1.16%(1.48)* | 2.5% | 3.03% |

*Note:
If the polymerization stage reaction mass in Example 7 had been reacted at the maximum polymerization temperature only as long as is the polymerization reaction mass in Example 6, so that the loss of stearyl ester end groups from the product group via 1-octadecene formation would be about the same in Examples 6 and 8, the loss of the stearyl carboxylate ester end groups in Example 7 would be about 18.9%; the percent conversion of Stearyl Alcohol to Stearyl Ester End Groups in Example 7 would be about 81.1%, the mole percent of stearyl carboxylate ester end groups in the product would be about 30%, and the weight percent stearyl carboxylate end groups in the product would be 1.48%, as is shown in the parenthesis.

A comparison of the data of Examples 8 and 9 with that of Examples 6 and 7 on the last page of Table II, illustrates that limiting the duration of heating the polymerization mass at the final polymerization reaction temperature to a period of less than about 6 hours in accordance with the invention effectively diminishes the loss of the $C_8$-$C_{45}$ alkyl carboxylate ester end groups from the product via formation of olefin.

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. In a linear aromatic polyester which comprises residues of a bisphenol and an aromatic dicarboxylic acid and in which the terminal residues of the polyester chain comprise a residue of said dicarboxylic acid, the improvement wherein the end carboxylate groups of said terminal dicarboxylic acid residues comprise a minor, hydrolysis-stabilizing proportion of above about 2 weight percent, based on the polyester, of a carboxylate ester of an aliphatic monofunctional hydrocarbon alcohol of 8 to 45 carbon atoms.

2. The polyester of claim 1 wherein said dicarboxylic acid has the formula:

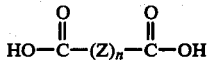

wherein Z is —Ar— or —Ar—Y—Ar— where Ar is aromatic, Y is alkylene, haloalkylene, —O—, —S—, —SO₂—, SO₃—, —CO—,

or GN< wherein G is alkyl, haloalkyl, aryl, haloaryl, alkylaryl, haloalkylaryl, arylalkyl, haloarylalkyl, cycloalkyl or cyclohaloalkyl; and n is 0 or 1, the organic residue of said aliphatic monofunctional alcohol is a saturated alkyl group, and said carboxylate ester end groups are present in the polyester in a proportion of above about 2 to about 20 weight percent based on the weight of the polyester.

3. The polyester of claim 2 wherein said dicarboxylic acid is an aromatic dicarboxylic acid, said carboxylate ester end groups are esters of an acyclic alcohol, and said carboxylate ester end groups are present in a proportion of about 2.5 to about 10 weight percent.

4. The polyester of claim 3 wherein said aromatic dicarboxylic acid is selected from the group consisting of isophthalic acid, terephthalic acid, and mixtures thereof, said carboxylate ester groups are esters of a primary aliphatic alcohol and the said carboxylate ester end groups are present in a proportion of about 2.5 to about 5 weight percent.

5. The polyester of claim 4 wherein said bisphenol has the formula:

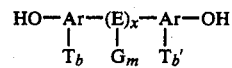

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO₂—, —SO₃—, —CO—,

or GN<; T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1, and said alcohol is a straight chain alcohol of 9 to 40 carbon atoms.

6. The polyester of claim 5 wherein the bisphenol is bisphenol-A and the aliphatic alcohol contains from 12 to 30 carbon atoms.

7. The polyester of claim 6 wherein the carboxylate ester groups derived from said alcohol are present in a proportion of about 50 mole percent based on the total end groups in the polyester and the number of carbon atoms in the alcohol is 15 to 20.

8. The polyester of claim 7 wherein the alcohol is stearyl alcohol.

9. A linear aromatic polyester of claim 1 consisting of residues of bisphenol-A and a dicarboxylic acid selected from isophthalic acid, terephthalic acid and mixtures thereof containing about 5 to 100 mole percent based on the total end groups in the polyester of carboxylate ester end groups derived from a monofunctional saturated acyclic aliphatic alcohol, the aliphatic residue of which contains 12 to 30 carbon atoms.

10. The polyester of claim 1 wherein there is present a filler material.

11. The product of the process of claim 1 wheren the polyester has a weight average molecular weight corresponding to a polyester intrinsic viscosity, measured in a 0.5% by weight solution of the polyester in symmetrical tetrachloroethane at 30° C., of about 0.2 to less than about 0.5 dl/g.

12. A molded article prepared from the product of claim 1.

13. A molded article prepared from the product of claim 10.

14. A molded article prepared from the product of claim 11.

15. In the process of preparing a linear aromatic polyester which comprises residues of a bisphenol and an aromatic dicarboxylic acid by the polymerization esterification reaction of said bisphenol and a diacyl halide of said dicarboxylic acid, the improvement wherein a minor molar proportion, based on the molar proportion of the diacyl halide, of a monofunctional aliphatic hydrocarbon alcohol of 8 to 45 carbon atoms is reacted with said diacyl halide prior to the polymerization esterification reaction of the diacyl halide and the bisphenol.

16. The process of claim 15 wherein with the diacyl halide reactant prior to the polymerization esterification the molar proportion of the alcohol is about 0.1 mole percent to about 25 mole percent.

17. In the process of preparing a linear aromatic polyester which comprises monomer residues of a bisphenol and a dicarboxylic acid by transesterification polymerization of said bisphenol and a diaryl ester of said dicarboxylic acid, the improvement wherein a minor molar proportion, based on the molar proportion of the diaryl ester of a monofunctional aliphatic hydrocarbon alcohol of 8 to 45 carbon atoms is transesterified into the polyester.

18. The process of claim 17 wherein the monofunctional aliphatic alcohol is mixed and reacted with the diaryl ester simultaneously with mixing of the bisphenol and the diaryl ester to commence the polymerization transesterification reaction.

19. The process of claim 17 wherein the residence time of the polymerization reaction mass at the final maximum polymerization reaction temperature is an effective residence time for polymerization less than about 6 hours.

20. The process of claim 19 wherein the residence time is about 1 to about 4 hours.

* * * * *